(12) United States Patent
Hiray et al.

(10) Patent No.: US 12,361,924 B2
(45) Date of Patent: Jul. 15, 2025

(54) SYSTEMS AND METHODS FOR AUDIO TRANSCRIPTION SWITCHING BASED ON REAL-TIME IDENTIFICATION OF LANGUAGES IN AN AUDIO STREAM

(71) Applicant: RingCentral, Inc., Belmont, CA (US)

(72) Inventors: Sushant Hiray, Redwood City, CA (US); Prashant Kukde, Milpitas, CA (US); Shashi Kant Gupta, Hazaribagh (IN)

(73) Assignee: RingCentral, Inc., Belmont, CA (US)

( * ) Notice: Subject to any disclaimer, the term of this patent is extended or adjusted under 35 U.S.C. 154(b) by 337 days.

(21) Appl. No.: 18/147,130

(22) Filed: Dec. 28, 2022

(65) Prior Publication Data

US 2024/0221721 A1    Jul. 4, 2024

(51) Int. Cl.
| | |
|---|---|
| *G10L 15/22* | (2006.01) |
| *G10L 13/08* | (2013.01) |
| *G10L 15/00* | (2013.01) |
| *G10L 15/16* | (2006.01) |

(52) U.S. Cl.
CPC .......... *G10L 13/086* (2013.01); *G10L 15/005* (2013.01); *G10L 15/16* (2013.01)

(58) Field of Classification Search
CPC ....... G10L 15/063; G10L 15/22; G10L 13/02; G10L 15/26; G10L 13/086; G10L 15/005; G10L 2015/088; G10L 15/16; G10L 25/30; G06F 21/32; G06F 40/40; G06F 40/58; G06F 40/263; G06N 3/045; G06N 3/044
See application file for complete search history.

(56) References Cited

U.S. PATENT DOCUMENTS

| | | | | |
|---|---|---|---|---|
| 10,593,321 | B2* | 3/2020 | Watanabe | G10L 15/063 |
| 10,971,153 | B2 | 4/2021 | Thomson et al. | |
| 2013/0238336 | A1* | 9/2013 | Sung | G10L 15/32 704/255 |
| 2018/0018973 | A1* | 1/2018 | Moreno | G10L 17/02 |
| 2019/0189111 | A1* | 6/2019 | Watanabe | G10L 15/16 |
| 2020/0219492 | A1* | 7/2020 | Apsingekar | G10L 15/32 |
| 2020/0226327 | A1* | 7/2020 | Matusov | G06N 3/045 |
| 2020/0243094 | A1* | 7/2020 | Thomson | G10L 15/28 |
| 2020/0334233 | A1* | 10/2020 | Lee | G06F 16/243 |
| 2020/0380215 | A1* | 12/2020 | Kannan | G10L 15/005 |

(Continued)

*Primary Examiner* — Jakieda R Jackson
(74) *Attorney, Agent, or Firm* — Ansari Katiraei LLP; Arman Katiraei; Sadiq Ansari

(57) ABSTRACT

Disclosed is a multi-language translation system and associated methods that adapt to users speaking different languages, and that convert each spoken language to a target language. The system trains a neural network using audio of different speakers speaking different languages, and generates vectors with different sets of audio features that identify each of the different languages. The system receives an audio stream, transcribes a first snippet from a first language to the target language based on a first vector classifying the first audio snippet features to the first language, transcribes a second audio snippet from a new language to the target language based on the first vector being unable to classify the second audio snippet features to the first language, and transcribes a third audio snippet from a second language to the target language based on a second vector classifying the third audio snippet to the second language.

19 Claims, 9 Drawing Sheets

(56) References Cited

U.S. PATENT DOCUMENTS

| | | | | |
|---|---|---|---|---|
| 2021/0004440 A1* | 1/2021 | Purnell | .................... | G06N 7/01 |
| 2021/0004534 A1* | 1/2021 | Mizushima | ............ | G06N 3/045 |
| 2021/0020161 A1* | 1/2021 | Gao | ........................ | G10L 13/00 |
| 2021/0233510 A1* | 7/2021 | Datta | .................... | G10L 15/063 |
| 2022/0108688 A1* | 4/2022 | Wang | .................... | G10L 15/063 |
| 2023/0086558 A1* | 3/2023 | Katz | ...................... | H04N 7/181 |
| | | | | 348/143 |
| 2023/0089902 A1* | 3/2023 | Arkhangorodsky | .... | G06F 40/58 |
| | | | | 704/277 |
| 2023/0147895 A1* | 5/2023 | Balagopalan | ........ | A61B 5/4064 |
| | | | | 600/301 |
| 2023/0325612 A1* | 10/2023 | Ghatage | ................ | G06F 40/263 |
| 2023/0386475 A1* | 11/2023 | Frenzel | .................. | G10L 17/04 |

\* cited by examiner

US 12,361,924 B2

SYSTEMS AND METHODS FOR AUDIO TRANSCRIPTION SWITCHING BASED ON REAL-TIME IDENTIFICATION OF LANGUAGES IN AN AUDIO STREAM

TECHNICAL FIELD

The present disclosure relates generally to the field of audio translation and transcription. Specifically, the present disclosure relates to systems and methods for audio transcription switching based on real-time identification of languages in an audio stream.

BACKGROUND

A static or single language translation system converts dialog that is spoken in a first language to a target second language. Should a speaker speak a third language that is different than the first language, the resulting translation or transcription becomes garbled and nonsensical. The static or single language translation system continues to interpret and translate the words, sentences, and/or grammar spoken in the third language using a translator defined for the first language.

DETAILED DESCRIPTION OF PREFERRED EMBODIMENTS

Figure 1:
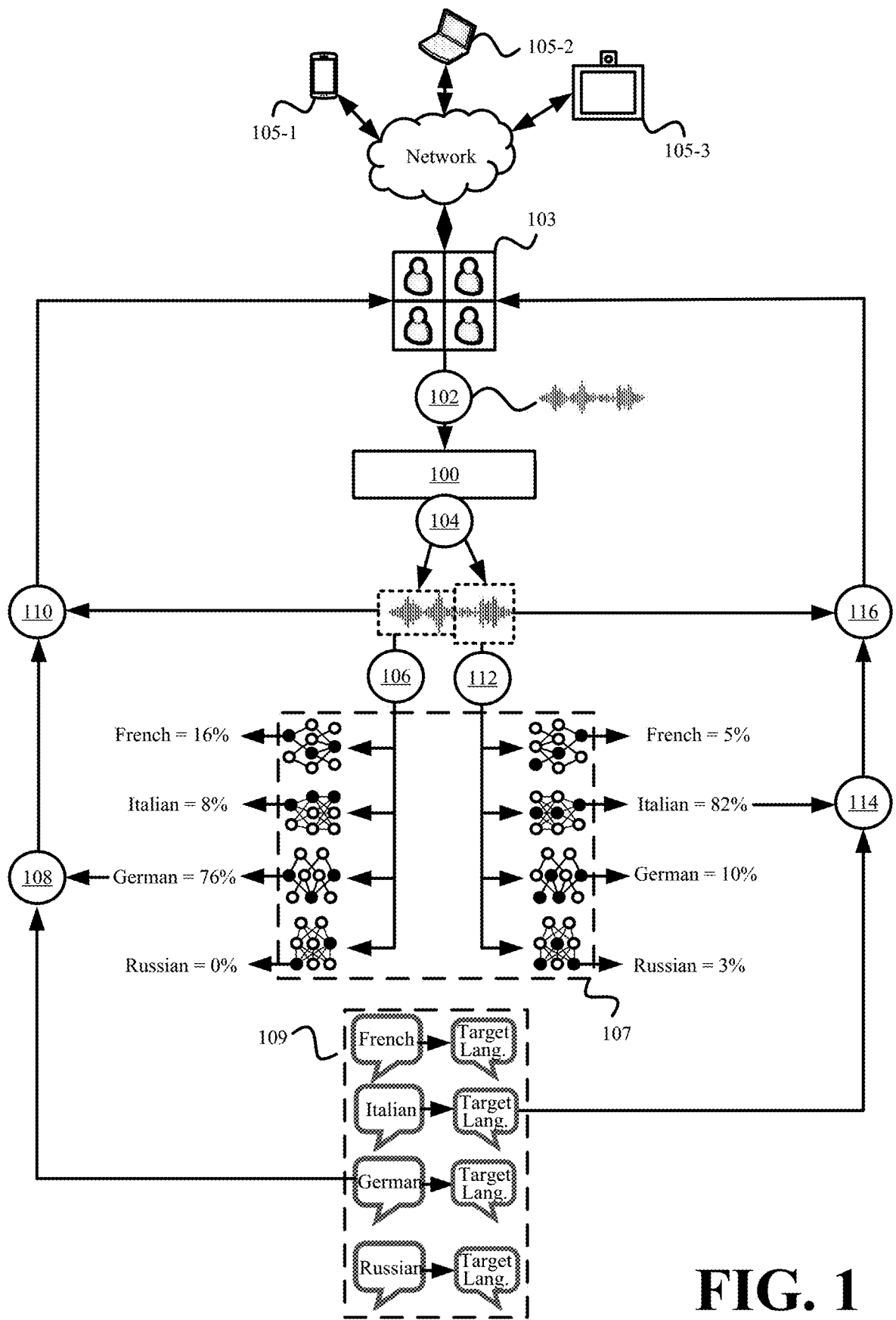
FIG. 1 illustrates an example of performing dynamic multi-language translation in accordance with some embodiments presented herein.

The current disclosure provides a technological solution to the technological problem of detecting and translating between different spoken languages in real-time as one or more users switch between the different languages during an online or computer-hosted presentation, conversation, or conference. The current disclosure provides a multi-language translation system ("MHLTS") and associated methods that automatically adapt to users speaking different languages during the presentation, conversation, or conference, and that convert, translate, and/or transcribe the audio from each spoken language to text or audio of a desired target language.

The MLTS allows the conference participants to speak in different native languages (e.g., different languages they are most comfortable with that other participants may not understand), and translates the spoken dialog to one or more target languages selected by each conference participant. Accordingly, a conference involving multiple participants is no longer limited to a first base language that is selected for the conference, or a second language that a static or single language translation system translates and/or transcribes to the first language. For instance, the static or single language translation system may translate Spanish spoken by a first user into English text for a second user, but if the first user also speaks Russian, the static or single language translation system assumes the Russian dialog to be in Spanish, and outputs a garbled and non-sensical Spanish-to-English translation for the Russian words spoken by the first user. The MLTS detects when Spanish is spoken, performs a Spanish-to-English translation for the detected Spanish dialog, detects when Russian is spoken, and performs a Russian-to-English translation for the detected Russian dialog.

The MLTS provides a real-time transcription of the dialog as it is spoken, and updates and/or corrects any translations that are incorrect due to a lag in detecting a language transition. Accordingly, the translation accuracy is maintained even when the same speaker abruptly switches between two or more languages and uses the same or similar vocal properties when speaking the two or more languages.

With the MLTS performing the real-time translation, each speaker is free to speak in their native language or the languages they are most comfortable speaking as opposed to speaking with a hard-to-understand accent, more limited vocabulary, and/or incorrect grammar of a less-familiar second language that other conference participant understand or that a static or single language translation system is able to translate. Therefore, the MLTS provides the technological benefit of dynamic real-time language translation and/or transcription across three or more languages that are not preconfigured or preselected for translation and/or transcription, and provides the further technological benefit of a multilingual conferencing solution for large numbers of participants speaking different languages.

The MLTS uses one or more artificial intelligence and/or machine learning ("AI/ML") techniques to train one or more language identification models. The one or more language identification models represent a neural network with different connected and/or linked sets of neurons. Each connected and/or linked set of neurons forms a vector for detecting when a particular language is spoken. The set of neurons associated with a vector represent a different combination of modeled acoustic features and/or wording that identify a particular language and/or differentiate the particular language from other languages with a probability. The MLTS uses the probability values output by the vectors to select between different translation engines for the translation and/or transcription of the audio in the detected language to a desired output language.

In some embodiments, the MLTS improves the accuracy and speed of detecting the switch between a first language and a second language being spoken during a conversation based on user models. The MLTS develops a user model from specified user preferences and/or tracking user activity in other conversations. Specifically, the user model tracks the preferred or spoken languages by a particular user, and/or specifies adjustments to the language identification model based on the particular user's accent and/or manner of speaking one or more languages. For instance, if a particular user is known to speak Spanish and Italian, the MLTS may modify the language detection operations when the particular user is determined to be speaking so that the vectors for identifying the Spanish and Italian languages are applied to the particular user's audio in order to determine which of those two languages is being spoken, rather than applying other vectors from the language identification model that are used to identify other languages that the particular user does not speak. This improves the MLTS language detection accuracy by preventing the particular user dialog from incorrectly being classified as French.

FIG. 1 illustrates an example of performing the dynamic multi-language translation in accordance with some embodiments presented herein. FIG. 1 includes MLTS 100, conference system 103, and conference devices 105-1, 105-2, and 105-3 (collectively referred to as "conference devices 105" or individually as "conference device 105").

Conference devices 105 correspond to devices or machines that different users use to connect to and participate in a particular conference. Conference devices 105 include microphones for recording the users' audio, speakers to play audio from the different users, and network connectivity to send and receive the conference audio to and from conference system 103. In some embodiments, conferences devices 105 further include cameras for recording video or images of the users. Conference devices 105 transmit the video or images along with the recording audio to conference system 103.

Conference system 103 includes one or more devices or machines for combining the audio and/or video streams from conference devices 105 into a single stream. Specifically, the single stream unifies the audio streams and/or video streams from the participating users so that the participating user are able to see and hear each other in real-time on their respective conference devices 105.

In some embodiments, conference system 103 supports collaboration, sharing, and/or other user interaction. For instance, first conference device 105-1 shares its screen with other conference devices 105-2 and 105-3 that participate in the same conference, and conference system 103 creates an interactive interface for the different users to edit, modify, add, and/or otherwise interact with the shared screen while simultaneously being able to see and hear each other. Conference system 103 supports collaboration on projects, files, documents, white boards, and/or other interactive elements.

MLTS 100 is integrated as part of or interfaces with conference system 103 to perform a real-time translation and/or transcription of the dialog within each conference. In some embodiments, MLTS 100 receives (at 102) the unified audio stream that is created by conference system 103 for a particular conference. The unified audio stream combines the audio streams from each conference device 105 that connects to, accesses, and/or is otherwise participating in the particular conference. In some other embodiments, MLTS 100 receives the individual audio streams from each conference device 105 that participates in the particular conference.

MLTS 100 parses (at 104) the audio within the one or more received streams into snippets. In some embodiments, each snippet may be a specified length of audio. The snippets may include overlapping or non-overlapping samples of the audio within the one or more received streams. For instance, MLTS 100 may parse (at 104) the audio stream into snippets that are each three seconds in duration, and a first snippet may span 0-3 seconds of the audio and a second snippet may span 1-4 seconds of the audio. In some other embodiments, MLTS 100 parses (at 104) the audio stream into snippets of different length using speech detection and/or other audio parsing techniques. For instance, each snippet may correspond to the audio of a different speaker. The audio parsing techniques detect when a different speaker begins speaking, and create a new audio snippet for the audio of that speaker. In some such embodiments, each snippet may have a maximum duration (e.g., five seconds), and a new snippet may be created for the audio of the same speaker when the speaker speaks continuously for more than the maximum duration. The different length snippets may also be generated according to the language detection performance. For instance, MLTS 100 may detect a language change in snippets that are 0.3 seconds in length and may use longer 3 second snippets to verify or confirm the language change. Accordingly, MLTS may parse (at 104) the audio stream into 0.3 second and 3 second snippets that contain overlapping dialog (e.g., the 3 second snippet includes the 0.3 seconds of audio from a 0.3 second snippet) or that contain non-overlapping dialog (e.g., switching between generating 0.3 second snippets and 3 second snippets).

MLTS 100 analyzes (at 106) the audio in a first snippet with language identification model 107. Language identification model 107 contains one or more sets of vectors. Each vector is formed by a connected set of neurons that represent different acoustic features, words, and/or other audio characteristics for differentiating a particular language from other languages. A set of vectors may represent different combinations of acoustic features, words, and/or other audio characteristics that identify the particular language with different probabilities. Language identification model 107 outputs one or more predictions or probability values that the audio contained within a given snippet is in the particular language or another language modeled by language identification model 107.

From the probability values output by language identification model 107, MLTS 100 selects (at 108) one of several translation engines 109 to translate and/or transcribe the dialog of the first audio snippet from the identified language to a desired target language. As shown in FIG. 1, translation engines 109 include a first translation engine for translating French to the target language, a second translation engine for translating Italian to the target language, a third translation engine for translating German to the target language, and a fourth translation engine for translating Russian to the target language. MLTS 100 determines that the probability values associated with the first snippet indicate that the audio in the first snippet is most likely German, selects (at 108) the third translation engine to convert the audio in the first snippet from German to the target language, and converts (at 110) the first snippet audio from German to the desired target language using the selected (at 108) third translation engine. Converting (at 110) the first snippet audio includes generating a transcript (e.g., text) and/or audio that translates the German audio from the first snippet to the desired target language.

MLTS 100 analyzes (at 112) the audio in a second snippet that is parsed from the audio stream using language identification model 107. The probability values output for the second snippet by language identification model 107 indicate that the audio in the second snippet is most likely Italian. Accordingly, MLTS 100 selects (at 114) the second translation engine from translation engines 109 that performs the translation and/or transcription of Italian to the target language, and converts (at 116) the second snippet audio from Italian to the target language.

It may take time for MLTS 100 to detect that the audio has transitioned from a first language to a second language irrespective of whether the language transition is because of a single speaker switching between speaking the first and second languages, or a first speaker speaking in the first language and a second speaker speaking in the second language after the first speaker. Until the language switch is detected with a threshold amount of certainty, the second language audio may be converted, translated, and/or transcribed using a translation engine that translates the first language. Consequently, the translation of the second language audio may initially be incorrect or incomprehensible.

To correct for the lag in detecting the language transition and/or the possibility of an incorrect translation for a particular snippet where a language transition occurs, MLTS 100 tags the particular snippet where the language transition is detected or suspected. MLTS 100 detects or suspects a language transition occurring in a snippet when the probability values that are output for that snippet are less than a threshold amount of certainty for any particular language. MLTS 100 performs a retranscription of the tagged snippet once the language detection model detects the language spoken in subsequent snippets that follow the tagged snippet with the threshold amount of certainty. Accordingly, MLTS 100 transcribes the tagged snippet using the translation engine for the prior language to provide a real-time translation to one or more users, and retranscribes the particular snippet using the translation engine for the new language once the new language is detected with the threshold amount of certainty in the subsequent snippets.

Figure 2:
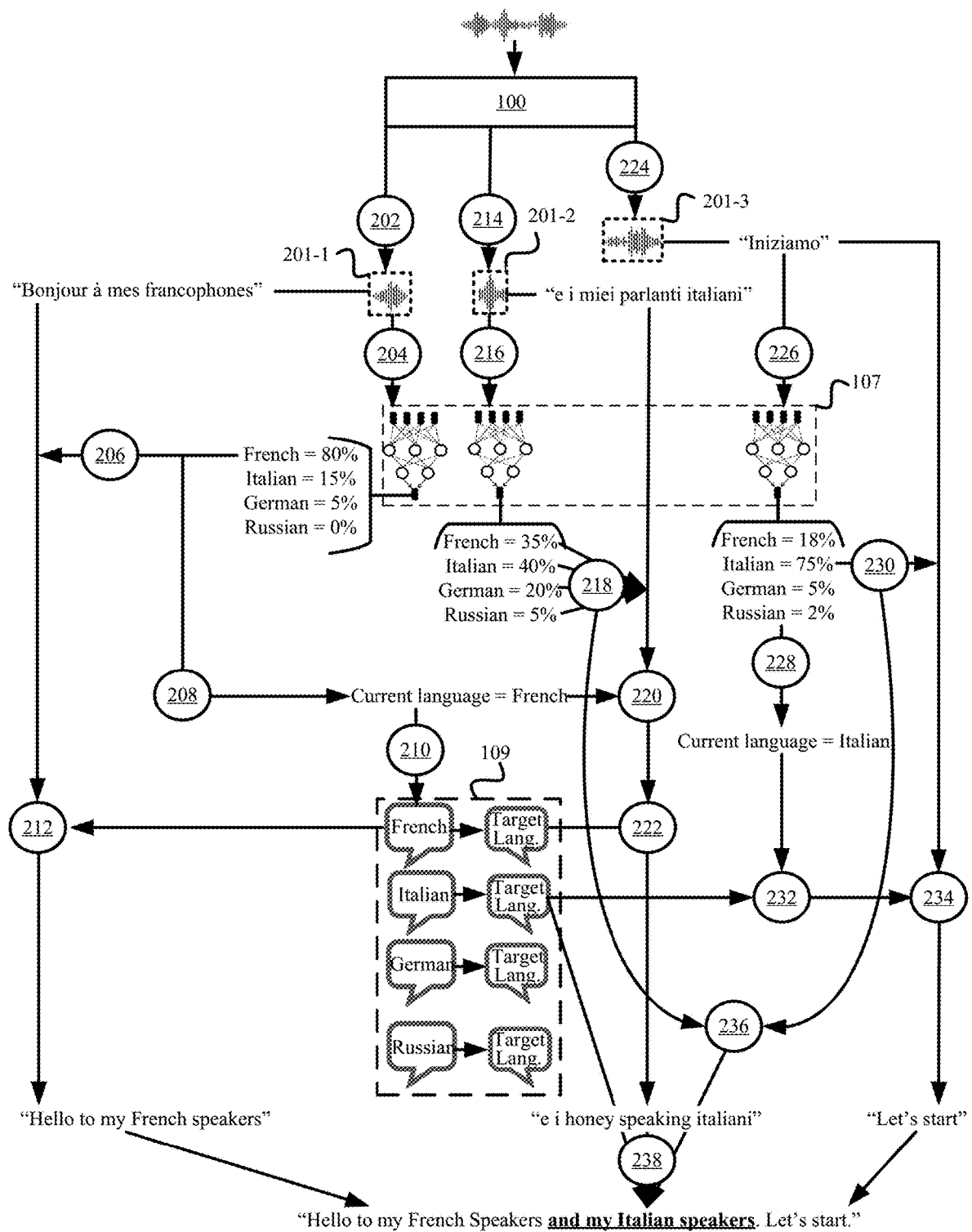
FIG. 2 illustrates an example of performing and correcting a real-time transcription because of the lag associated with detecting the transition from one language to another in accordance with some embodiments presented herein.

FIG. 2 illustrates an example of performing and correcting a real-time transcription because of the lag associated with detecting the transition from one language to another in accordance with some embodiments presented herein. MLTS 100 monitors an active or ongoing conversation involving one or more participants. As part of monitoring the active or ongoing conversation, MLTS 100 obtains (at 202) and/or extracts first audio snippet 201-1 with dialog from a particular participant.

MLTS 100 inputs (at 204) first audio snippet 201-1 into language identification model 107. MLTS 100 determines that the language spoken in first audio snippet 201-1 is a first language based on the acoustic features of first audio snippet 201-1 matching with a threshold amount of certainty to modeled acoustic features for the first language in language identification model 107. For instance, a first vector of language identification model 107 outputs a first probability value of 80% that the audio from first audio snippet 201-1 is the first language, a second vector of language identification model 107 outputs a second probability value of 15% that the audio from first audio snippet 201-1 is a second language, a third vector of language identification model 107 outputs a third probability value of 5% that the audio from first audio snippet 201-1 is a third language, and a fourth vector of language identification model 107 outputs a fourth probability value of 0% that the audio from first audio snippet 201-1 is a fourth language. In this example, the threshold amount of certainty is set at 75%. Accordingly, MLTS 100 determines that the audio from first audio snippet 201-1 is in the first language based on the first probability value satisfying the threshold amount of certainty (e.g., 80%>75%).

MLTS 100 tags (at 206) first audio snippet 201-1 with a first language identifier, sets (at 208) the current language of the conversation to the first language, selects (at 210) a first translation engine for translating between the first language and a desired target language, and transcribes (at 212) first audio snippet 201-1 from the first language to the desired target language using the first translation engine. In some embodiments, tagging (at 208) first audio snippet 201-1 with the first language identifier includes associating the probability values to first audio snippet 201-1. In some other embodiments, tagging (at 208) first audio snippet 201-1 with the first language identifier includes classifying and/or labeling first audio snippet 201-1 as containing audio in the first language.

As part of the continued monitoring of the active or ongoing conversation, MLTS 100 obtains (at 214) second audio snippet 201-2 with additional dialog from the particular participant. In some embodiments, MLTS 100 receives (at 214) second audio snippet 201-2 before or while transcribing (at 212) first audio snippet 201-1.

MLTS 100 inputs (at 216) second audio snippet 201-2 into language identification model 107. The probability values output from language identification model 107 for second audio snippet 201-2 do not satisfy the threshold amount of certainty for any language. For instance, the first vector outputs a first probability value of 35% that the audio from second audio snippet 201-2 is the first language, the second vector outputs a second probability value of 40% that the audio from second audio snippet 201-2 is the second language, the third vector outputs a third probability value of 20% that the audio from second audio snippet 201-2 is the third language, and the fourth vector outputs a fourth probability value of 5% that the audio from second audio snippet 201-2 is the fourth language. The lack of certainty in detecting the language of second audio snippet 201-2 may be due to the small sample of dialog associated with second audio snippet 201-2, second audio snippet 201-2 containing words that are found in two or more languages, the speaker's accent and/or vocal properties features remaining the same when transitioning between different languages, and/or other factors that prevent the clear differentiation of the language spoken in second audio snippet 201-2.

MLTS 100 tags (at 218) second audio snippet 201-2 with a language change identifier, selects (at 220) the translation engine for the current language that was last detected with the threshold amount of certainty for transcribing second audio snippet 201-2 since the language of second audio snippet 201-2 cannot be determined with the threshold amount of certainty, and transcribes (at 222) second audio snippet 201-2 from the first language to the desired target language based on the translations output by the first translation engine used for translation of the current language. In some embodiments, the language change identifier includes the probability values for the different possible languages output by language identification model 107 or the two largest probability values for the two languages that are suspected to make up the dialog of second audio snippet 201-2.

MLTS 100 obtains (at 224) third audio snippet 201-3 with additional dialog from the particular participant. MLTS 100 inputs (at 226) third audio snippet 201-3 into language identification model 107.

Language identification model 107 identifies with the threshold amount of certainty that the language spoken in third audio snippet 201-3 is the second language (e.g., Italian). MLTS 100 changes (at 228) the current language to the second language, tags (at 230) third audio snippet 201-3 with a second language identifier, selects (at 232) a second translation engine for translating between the second language and the desired target language, and transcribes (at 234) third audio snippet 201-3 from the second language to the desired target language using the second translation engine.

Since the current language has changed, MLTS 100 analyzes (at 236) the tags that are associated with earlier audio snippets (e.g., second audio snippet 201-2) to identify earlier snippets that were not classified to a specific language with the threshold amount of certainty because of a language transition occurring in those snippets. In particular, MLTS 100 determines that the transition from the first language to the second language began or occurred in second audio snippet 201-2 based on the tags that are associated with second audio snippet 201-2 and the subsequent third audio snippet 201-3.

MLTS 100 retranscribes (at 238) the dialog from second audio snippet 201-2 using the second translation engine because the identified language of third audio snippet 201-3 is attributed to second audio snippet 201-2 based on second audio snippet 201-2 transitioning away from the first language of first audio snippet 201-1 and the second language being identified with the threshold amount of certainty in third audio snippet 201-3 that follows second audio snippet 201-2 in the audio stream. Retranscribing (at 238) the dialog from second audio snippet 201-2 includes replacing the text that was generated for second audio snippet 201-2 in the transcription by the first translation engine with the text that is generated for second audio snippet 201-2 by the second translation engine. In this manner, MLTS 100 updates or corrects the transcription as more information about the current spoken language or the language that is transitioned to is obtained in subsequent audio snippets.

Figure 3:
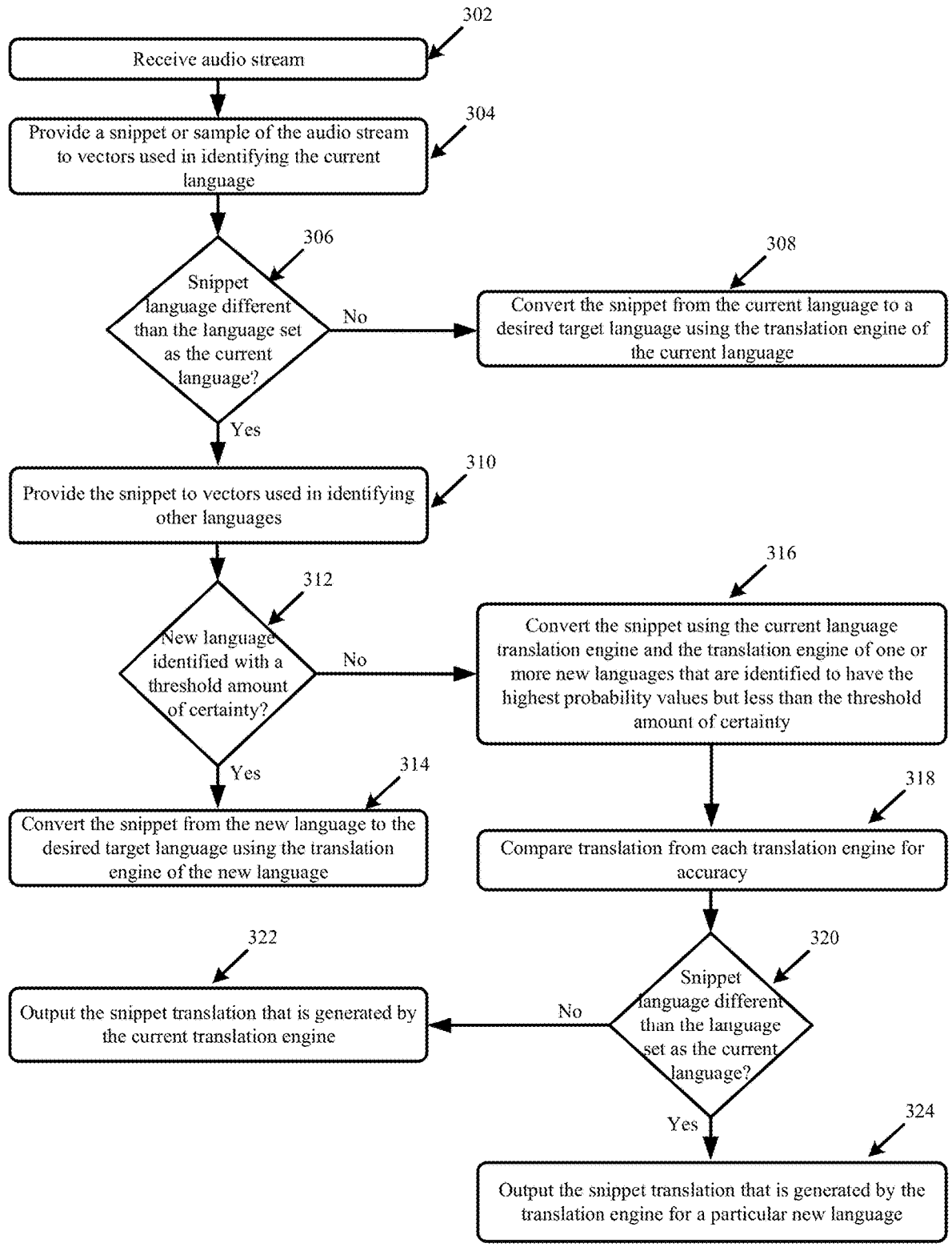
FIG. 3 illustrates a flow diagram for performing a two-stage language identification in accordance with some embodiments presented herein.

In some embodiments, MLTS 100 performs a two-stage language identification to improve language identification and/or to improve the accuracy of the translated and/or transcribed audio when speakers switch between different languages. FIG. 3 illustrates a flow diagram associated with MLTS 100 performing the two-stage language identification in accordance with some embodiments presented herein.

MLTS 100 receives (at 302) an audio stream. MLTS 100 provides (at 304) a snippet or sample of the audio stream to language identification model 107. Language identification model 107 compares acoustic features of the snippet against the language identification model vectors. The vectors correspond to different combinations of acoustic features that were modeled to identify different languages with different probabilities by one or more AI/ML techniques.

For efficiency and/or to avoid unnecessary computations when the language changes infrequently, MLTS 100 compares the snippet to the one or more vectors of the current language, rather than the vectors for all languages, to determine (at 306) if the current language has changed (e.g., if the language of the snippet is different than the language set as the current language). The current language corresponds to the last language that was detected with a threshold amount of certainty or a base language. For instance, when a conference takes place, is hosted, or involves participants that are mostly located in a region with an established primary language (e.g., Japan), then the current language may initially be set to the established primary language (e.g., Japanese).

MLTS 100 determines (at 306—No) that the current language has not changed in response to the one or more vectors that identify the current language outputting a probability value for the snippet that identifies the current language with a threshold amount of certainty. In this case, MLTS 100 uses the translation engine of the current language to convert (at 308), translate, and/or transcribe the dialog or other audio in the snippet from the current language to a desired target language.

MLTS 100 determines (at 306—Yes) that the current language has changed in response to the one or more vectors for the current language outputting a probability value for the snippet that identifies the current language with less than the threshold amount of certainty. In this case, MLTS 100 provides (at 310) the snippet to other vectors used in identifying other languages other than the current language.

MLTS 100 determines (at 312) if the other vectors identify a new language for that snippet that is different than the current language with a threshold amount of certainty. In response to determining (at 312—Yes) the new language with the threshold amount of certainty, MLTS 100 changes the current language to the new language, selects the translation engine for translating from the new language to the desired target language, and converts (at 314), translates, and/or transcribes the dialog or other audio in the snippet from the new language to the desired target language.

If MLTS 100 is unable to determine (at 312—No) the new language with the threshold amount of certainty based on the probability values output by language identification model 107 being less than the threshold amount of certainty, MLTS 100 performs a second stage language identification. Performing the second stage language identification includes converting (at 316), translating, and/or transcribing the dialog or other audio in the snippet using the translation engine for the current language and the translation engine for one or more other languages that were identified by language identification model 107 with the highest probability values but that are less than the threshold amount of certainty. For instance, if the language identified for the snippet is determined to be French with a 45% probability, Spanish with a 35% probability, and Italian with a 20% probability, MLTS 100 uses the French and Spanish translation engines to translate the snippet audio from French to the desired target language and from Spanish to the desired target language.

MLTS 100 compares (at 318) the translations produced by each translation engine for accuracy. In some embodiments, MLTS 100 inputs the translations into language identification model 107 to determine the translation accuracy. For instance, if the snippet audio contained French dialog and was translated to English using a Spanish-to-English translation engine and a French-to-English translation engine, the Spanish-to-English translation will contain more translational, grammatical, and/or other errors than the French-to-English translation. Accordingly, language identification model 107 will identify English as the language of the Spanish translation with a lower probability than the language of the French translation.

MLTS 100 determines (at 320) if the language of the snippet is different than the current language based on the translation comparison (at 318) and/or performing the second stage language identification. In response to determining (at 320—No) that the language of the snippet matches and is not different than the current language, MLTS 100 retains the current language, and outputs (at 322) the translation that is generated for the snippet by the current translation engine. In response to determining (at 320—Yes) that the language of the snippet is a particular new language that is different than the current language, MLTS 100 changes the current language to the particular new language, and outputs (at 324) the translation that is generated for the snippet by the translation engine for the particular new language.

Figure 4:
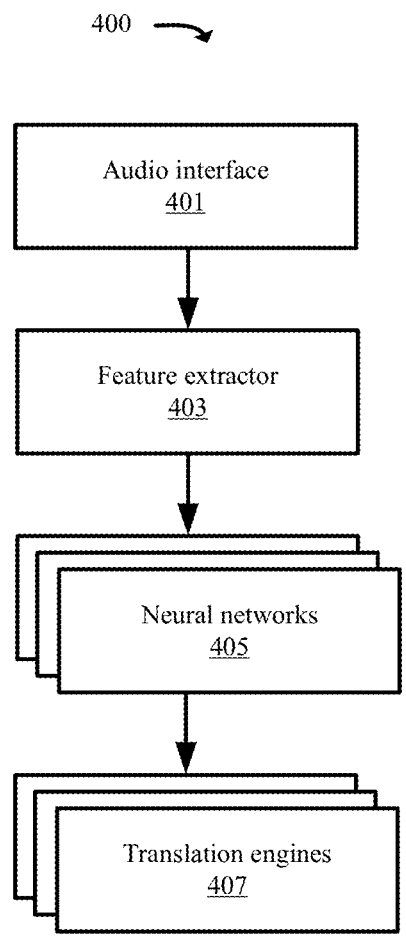
FIG. 4 illustrates an example architecture for implementing the multi-language translation system ("MLTS") in accordance with some embodiments presented herein.

FIG. 4 illustrates an example architecture 400 for implementing MLTS 100 in accordance with some embodiments presented herein. Example architecture 400 includes audio interface 401, feature extractor 403, one or more neural networks 405, and translation engines 407. In some embodiments, architecture 400 includes fewer, additional, or different components. The components are executed by one or more processors, memory, storage, network, and/or other hardware resources of devices or machines on which MLTS 100 is implemented.

Audio interface 401 is the interface by which to input one or more audio streams into MLTS 100 for language identification and conversion. In some embodiments, audio interface 401 is connected to a conference system and receives the one or more audio streams from the conference system. In some other embodiments, audio interface 401 receives the one or more audio streams from the conference devices that communicate with one another over a data network. Audio interface 401 receives live and recording audio streams in any of several encodings or formats.

Feature extractor 403 performs audio parsing and acoustic feature identification. In some embodiments, feature extractor 403 executes one or more speech recognition tools, audio analysis tools, and/or AI/ML techniques to perform the audio parsing and to generate the audio snippets from the received audio streams. For instance, the speech recognition tools analyze the audio stream to detect when different speakers are speaking, and to generate snippets containing the audio of a single speaker.

The acoustic feature identification includes analyzing the audio within the received audio streams and/or parsed snippets in order to identify acoustic features associated with the audio. For instance, feature extractor 403 performs speech segmentation to identify intonations, pitch, inflection, tone, accent, annunciation, pronunciation, dialect, projection, sentence structure, spoken words, articulation, timbre, and/or other vocal properties associated with spoken dialog in the audio snippets. These and other acoustic features are used by neural networks 405 and the language identification model generated by neural network 405 to distinguish one language from other languages. In some embodiments, the acoustic features correspond to Mel-frequency cepstral coefficients ("MFCCs").

Neural networks 405 include one or more of a Convolutional Neural Network ("CNN"), Three-Dimensional CNN ("C3D"), Inflated Three-Dimensional CNN ("I3D"), Recurrent Neural Network ("RNN"), Artificial Neural Network ("ANN"), MultiLayer Perceptron ("MLP"), and/or other deep learning neural networks ("DNNs"). Neural networks 405 generate the language identification model for identifying when different languages are spoken. Neural networks 405 perform various pattern, trend, commonality, and/or relationship recognition over different combinations of acoustic features to identify specific combinations that distinguish one language from other languages with varying probabilities. In some embodiments, each neural network 405 includes different layers for modeling the relationship that different acoustic features or combinations of acoustic features have with respect to language identification. For instance, a first neural network layer determines patterns for intonation and pitch in different languages, and a second neural network layers determines relationships between different sentence structures and different languages.

Translation engines 407 translate one language into another language. MLTS 100 is configured with a translation engine 407 for every language that is identified by the language identification model generated by neural network 405 and for every supported target language. For instance, a first translation engine may translate French to English, a second translation engine may translate Italian to English, and a third translation engine may translate Arabic to English when the language identification models are defined to identify when French, Italian, and Arabic are spoken. Similarly, a first translation engine may translate French to English, a second translation engine may translate French to Italian, and a third translation engine may translate French to Arabic when the supported target languages are English, Italian, and Arabic. Translation engines 407 may use a combination of automatic speech recognition ("ASR"), natural language processing ("NLP"), dictionary translation, and/or other language conversion techniques to translate audio in one language to another.

Figure 5:
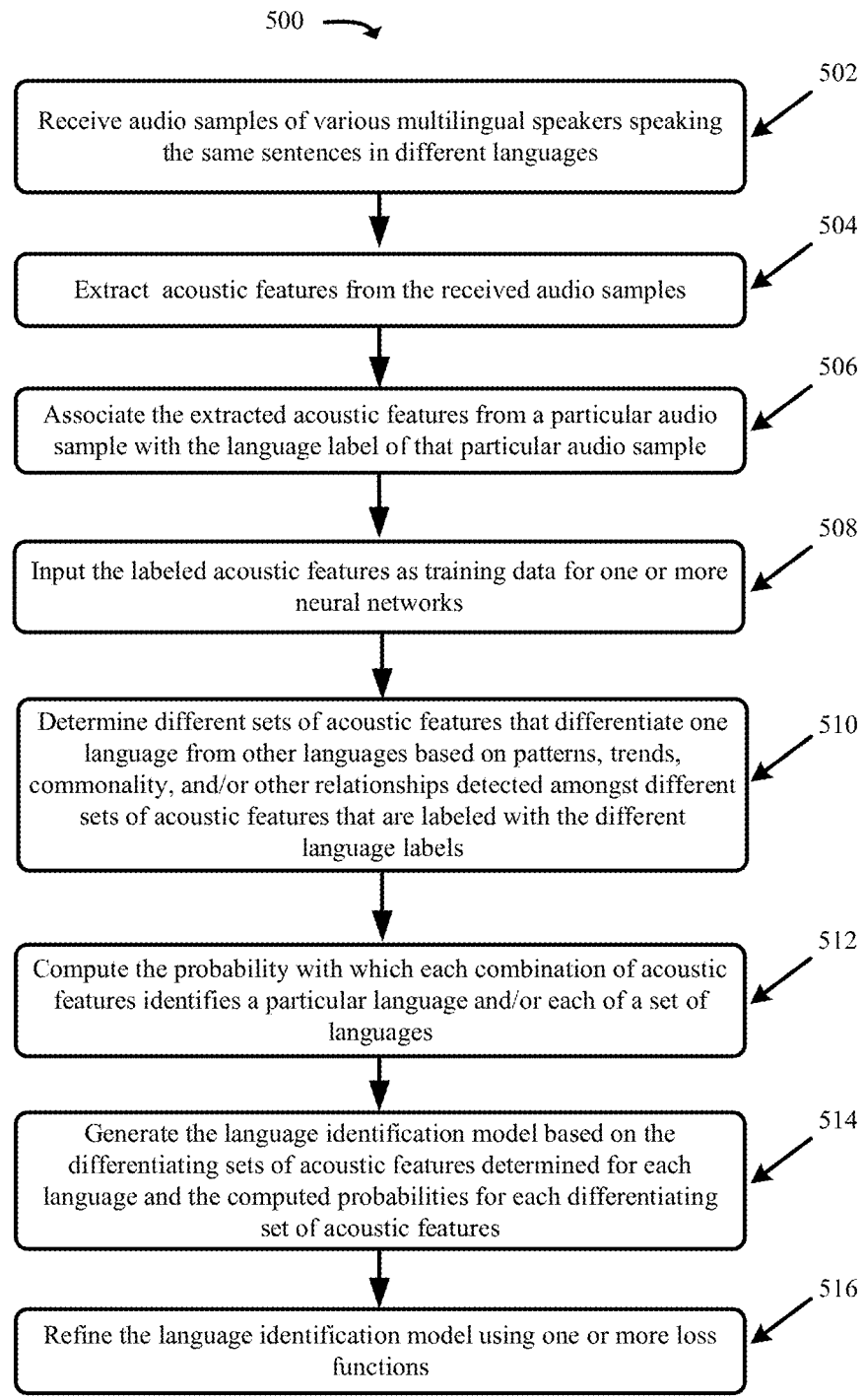
FIG. 5 presents a process for training one or more neural network for the generation of the language identification model in accordance with some embodiments presented herein.

FIG. 5 presents a process 500 for training one or more neural networks for the generation of the language identification model in accordance with some embodiments presented herein. Process 500 is implemented by MLTS 100 using one or more AI/ML techniques associated with the neural networks. In some embodiments, MLTS 100 is integrated as part of or runs in conjunction with a conference system that provides audio and/or video conferencing services for multiple users to connect and interact with one another.

Process 500 includes receiving (at 502) audio samples of various multilingual speakers speaking the same sentences in different languages. In some embodiments, the audio samples are labeled to identify the language with which the sentences are spoken in each audio sample. For instance, a first audio sample is of a particular user speaking a particular phrase or sentence in a first language, and a second audio sample is of the particular user speaking the particular phrase or sentence in a different second language. The samples of the same sentences spoken in the different languages are used to train the one or more neural networks in differentiating between the languages based on acoustic features other than just words as some languages have some of the same or similar sounding words. In some embodiments, the audio samples are collected from recordings of completed conferences or conversations, or from video and/or audio streams that are posted and accessible online from social media sites and/or other sites where the video and/or audio streams are shared or are publicly accessible.

Process 500 includes extracting (at 504) acoustic features from the received (at 502) audio samples. Extracting (at 504) the acoustic features includes determining intonations, pitch, inflection, tone, accent, annunciation, pronunciation, dialect, projection, sentence structure, spoken words, articulation, timbre, and/or other vocal properties associated with the spoken dialog in the audio samples. In some embodiments, MLTS 100 uses speech recognition tools for the acoustic feature extraction, or AI/ML techniques to analyze and extract the acoustic features from the audio snippets. In some embodiments, extracting (at 504) the acoustic features includes comparing the audio from the audio samples to frequency patterns associated with different words from different languages.

Process 500 includes associating (at 506) the extracted acoustic features from a particular audio sample with the language label of that particular audio sample. For instance, if a particular acoustic feature is extracted (at 504) from a French language audio sample, MLTS 100 labels that particular acoustic feature with the French language label and/or classification.

Process 500 includes inputting (at 508) the labeled acoustic features as training data for one or more neural networks. In other words, MLTS 100 trains the one or more neural networks using the labeled acoustic features.

Process 500 includes determining (at 510) different sets of acoustic features that differentiate one language from other languages based on patterns, trends, commonality, and/or other relationships detected amongst different sets of acoustic features that are labeled with the different language labels. For instance, the one or more neural networks use one or more AI/ML techniques (e.g., Long Short-Term Memory ("LSTM")) to perform joint classification and localization of the labeled acoustic features in order to detect the different sets of acoustic features that differentiate one language from other languages. More specifically, the neural networks may generate different combinations of acoustic features with the same label for a particular language, determine the percentage of other languages that have the generated combinations of acoustic features, and create a vector for a particular language identification model when a particular combination of acoustic features are present in a first threshold number of audio samples with a particular language label (e.g., present in 75% of audio samples with the particular language label) and are not present in a second threshold number of audio samples of other languages (e.g., present in less than 15% of audio samples with other language labels).

Each neural network or different layers of the same neural network may be configured to detect different patterns, trends, commonality, or relationships amongst the same acoustic feature combinations of different languages. For instance, a RNN may determine different temporal relationships between the tone, pitch, and/or accent with which different languages are spoken that accurately differentiates those languages from one another, whereas a CNN may use one or more pooling layers to detect repeating sounds (e.g., rolling of the letter r) as a means to differentiate one language from another language. More specifically, the neural networks may determine that a particular combination, pattern, relationship, or sequence of tone, pitch, and wording is unique to the Italian language, and that the particular combination is associated with a threshold number of the Italian audio samples to accurately differentiate and identify the Italian language from French, Spanish, and/or other languages. Similarly, the neural networks may determine that a different combination, pattern, relationship, or sequence of intonation, inflection, and annunciation is unique to the French language, and that the different combination is detected within the threshold number of the French audio samples to accurately differentiate and identify the French language from Italian, Spanish, and/or other languages. In other words, the one or more neural networks perform different comparisons of acoustic feature combinations that have different language labels to determine different patterns, trends, commonality, and/or relationships in the acoustic features of one language that other languages do not share, and that may be used to accurately differentiate that one language from the other languages.

Process 500 includes computing (at 512) the probability with which each combination of acoustic features identifies a particular language and/or each of a set of languages. In some embodiments, the probability with which a particular combination of acoustic features identifies a particular language is derived according to the percentage or frequency with which each acoustic feature from that particular combination is found in each audio sample that is labeled with the particular language, the percentage or frequency with which the particular combination of acoustic features are found in audio samples that are labeled with the other languages, the specificity or granularity associated with each acoustic feature, and/or other criteria. In other words, the one or more neural networks may quantify the degree with which each set of acoustic features uniquely identifies the particular language and/or differentiates the particular language from other languages in the labeled audio samples.

Process 500 includes generating (at 514) the language identification model for detecting different spoken languages in an input audio stream based on the differentiating sets of acoustic features determined (at 510) for each language and the computed (at 512) probabilities with which each set of acoustic features identifies a particular language. Generating (at 514) the language identification model includes generating different vectors as connected sets of neurons to represent a differentiating set of acoustic features that are determined to identify a language with a threshold amount of certainty, and defining the output of each vector to correspond to the one or more probability values with which the set of acoustic features represented by that vector identify one or more languages.

In some embodiments, generating (at 514) the language identification model includes providing the set of acoustic features with or without fixed positional encodings to an MLP. The MLP performs a feature encoding that transforms the set of acoustic features into a compact representation (e.g., a vector).

Process 500 includes refining (at 516) the language identification model using one or more loss functions. Refining (at 516) the language identification model includes using cross-entropy, mean squared error, and/or other loss modeling techniques to determine the accuracy with which the language identification model detects the languages within the received (at 502) labeled audio samples, and tuning the language identification model vectors to improve the language detection accuracy.

Specifically, MLTS 100 inputs the labeled audio samples into the generated (at 514) language identification model, and compares the language identified in each audio sample by the language identification model to the language label associated with that audio sample. MLTS 100 adjusts one or more neurons or vectors that produced the language identification, provides the labeled audio samples to the adjusted model, determines if the adjustment increased or decreased the accuracy of the language identification, and incorporates the adjustment into the language identification model if the accuracy is increased.

In some embodiments, refining (at 516) the language identification model includes removing the language identification model vectors that fail to identify the labeled language of a set of audio samples with a threshold amount of certainty. In some other embodiments, refining (at 516) the language identification model includes adjusting the weighting attributed to different neurons of a vector to improve the accuracy with which the vector identifies the language within the input labeled set of audio samples. For instance, neurons corresponding to different acoustic features may be removed, added, reweighted, or rearranged in a vector to improve the language detection accuracy of that vector.

Figure 6:
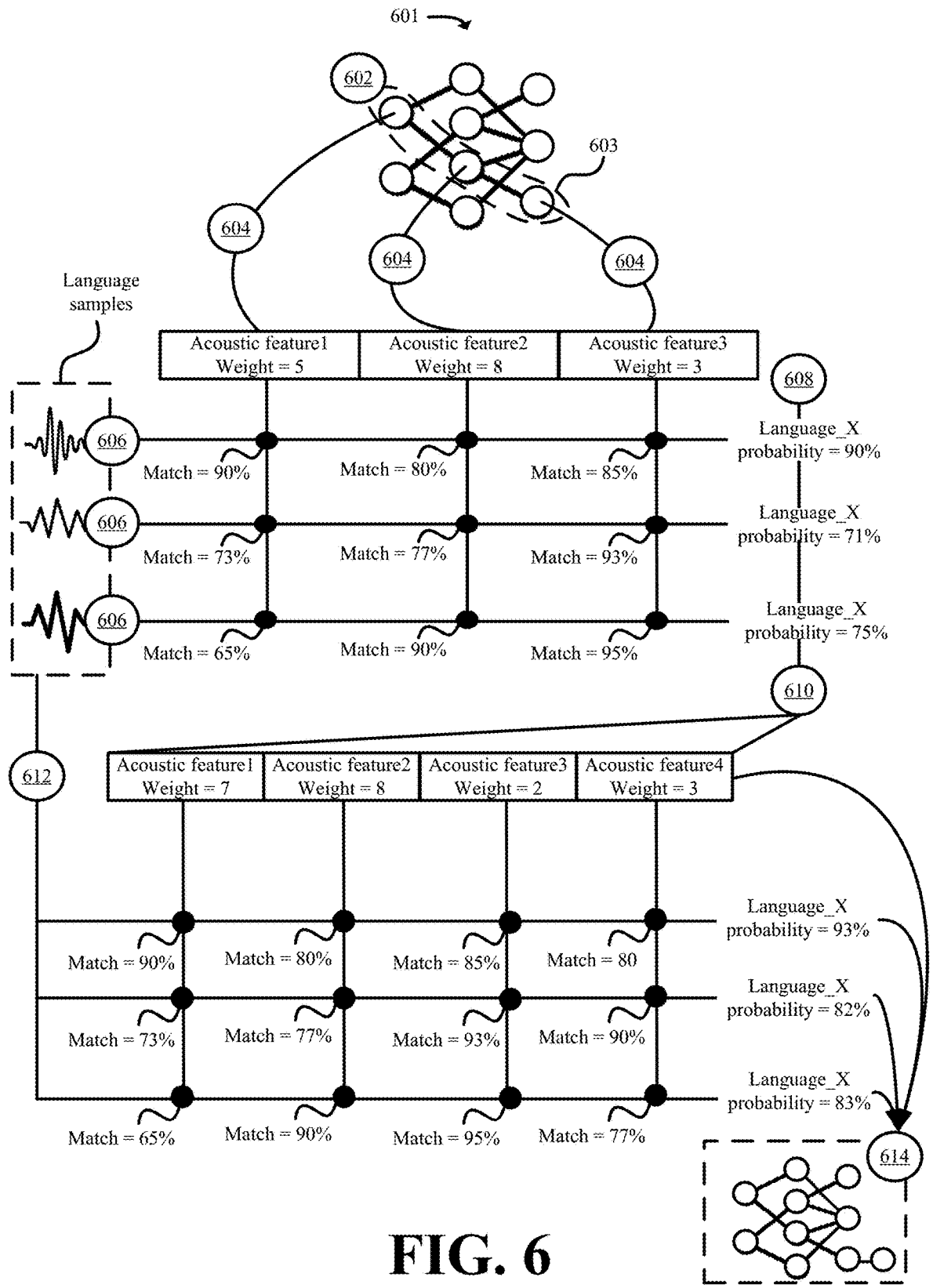
FIG. 6 illustrates an example of refining a vector from a language identification model in accordance with some embodiments presented herein.

FIG. 6 illustrates an example of refining a vector from a language identification model in accordance with some embodiments presented herein. As shown in FIG. 6, language identification model 601 is defined as a set of vectors.

Each vector of the set of vectors is a connected or linked set of neurons. Each neuron corresponds to an acoustic feature that is used in combination with other acoustic features of the same vector to identify a language with a probability and/or to differentiate one language from other languages with a probability. Accordingly, each vector represents a combination of acoustic features, that if present in an audio snippet, are determined by the AI/ML modeling techniques of the neural networks to predict the language of the audio snippet with a computed probability or accuracy.

Refining language identification model 601 includes isolating (at 602) vector 603 from language identification model 601, determining (at 604) the set of acoustic features that form vector 603, inputting (at 606) labeled audio samples with variations in the set of acoustic features to vector 603, quantifying (at 608) the accuracy with which vector 603 identifies the language of the labeled audio snippets with the set of acoustic features, and adjusting (at 610) vector 603 when the accuracy is below the threshold amount of accuracy or when the adjustments improve the accuracy with which vector 603 identifies and/or differentiates one language from other languages. As shown in FIG. 6, adjusting (at 610) vector 603 includes adding an acoustic feature as another neuron with which vector 603 determines the language in an audio snippet, and modifying the acoustic feature weighting to change the importance and/or contribution that each acoustic feature has to the language identification.

MLTS 100, via a loss function or the neural network, retests (at 612) the accuracy of vector 603 after adjusting (at 610) its acoustic features with the same set of labeled audio snippets. MLTS 100 determines that the language detection accuracy of vector 603 improved as a result of the adjustment, and updates (at 614) language identification model 601 to replace original vector 603 with the adjusted vector 603.

In some embodiments, MLTS 100 continually refines the language identification model as more training data becomes available. Additional training data may be obtained as new audio streams and/or video streams with audio are shared on different sites or platforms by speakers of different languages and/or speakers that speak the same language but with different accents or other variation in their vocal properties. Additional training data may also be obtained based on user feedback to MLTS 100. For instance, MLTS 100 may be used to provide a real-time transcription of different languages spoken during a conference. At the end of the conference or while the conference is ongoing, MLTS 100 may ask the user if the transcriptions are accurate or if the correct language is detected by MLTS 100. The user feedback is used to convert the unlabeled audio from the conference into labeled audio snippets that MLTS 100 feeds back into the neural network to further refine the language identification model.

In some embodiments, MLTS 100 improves the language identification accuracy, language identification performance (e.g., speed with which languages are identified and/or the minimum length or duration of a snippet for accurately determining the snippet language), and/or transcription accuracy by applying user models to the language identification model. MLTS 100 generates the user models to track language preferences of the users, accents, and/or variations between the user's manner of speaking and the modeled vectors of the language identification model.

Figure 7:
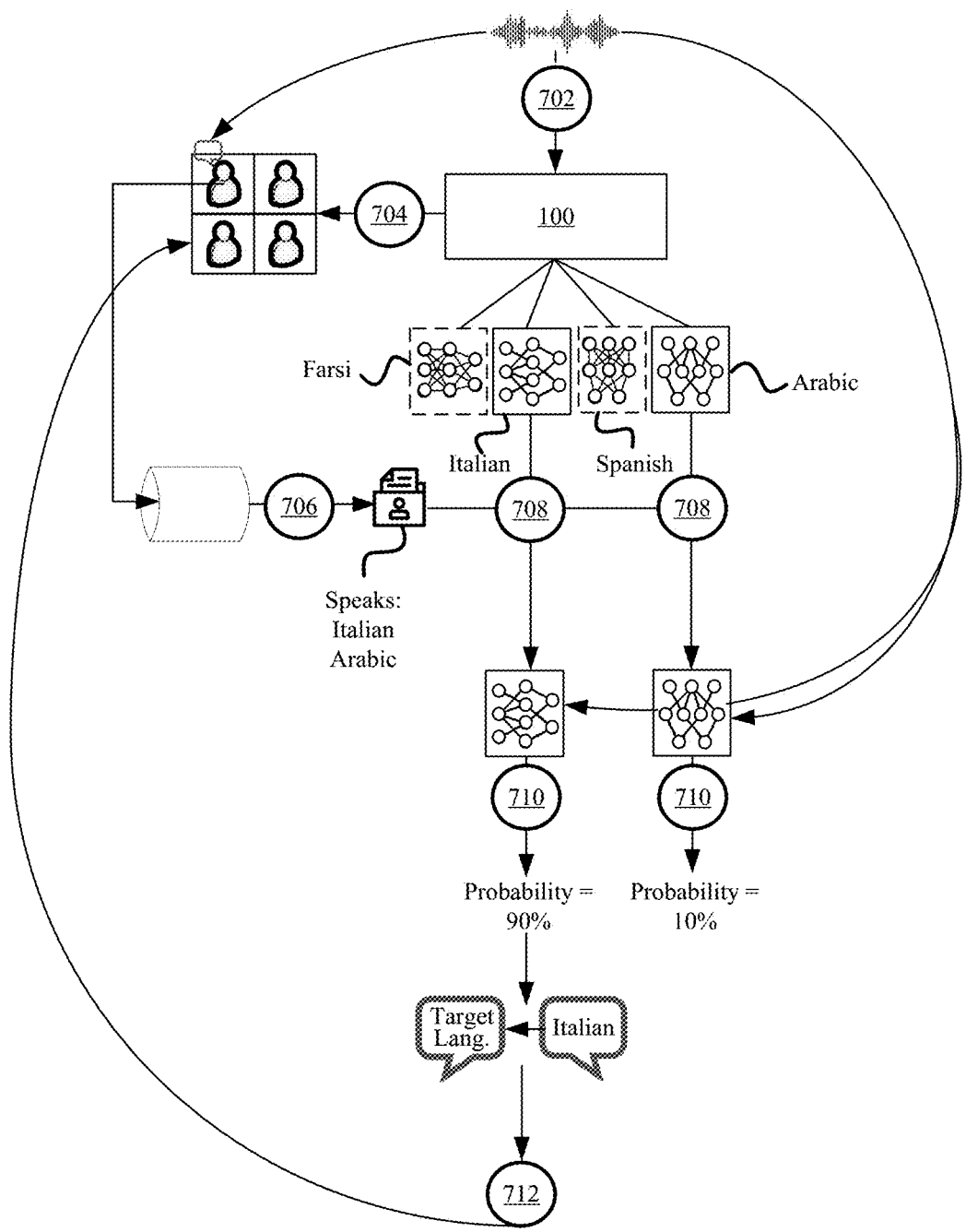
FIG. 7 illustrates an example of applying user models with the language identification model to improve language identification accuracy and performance in accordance with some embodiments presented herein.

FIG. 7 illustrates an example of applying user models with the language identification model to improve MLTS 100 accuracy and performance in accordance with some embodiments presented herein. MLTS 100 receives (at 702) an audio stream containing dialog.

MLTS 100 detects (at 704) that a particular user is speaking in a first audio snippet of the audio stream. In some embodiments, MLTS 100 detects (at 704) that the particular user is speaking by performing a voice analysis and matching the speaker's voice in the first audio snippet to a voice sample obtained for the particular user. The voice sample may be obtained when the particular user is testing their microphone prior to joining the conversation or conference. In some other embodiments, MLTS 100 detects (at 704) that the particular user is speaking based on the conference device that generates or transmits the first audio snippet. For instance, the conference system or MLTS 100 may receive and combine the audio streams from the connected conference devices to create a unified audio stream, and may tag the unified audio stream with identifiers for the users or conference devices that contribute or that provide dialog to different parts of the unified audio stream.

MLTS 100 selects (at 706) a user model that contains language preferences of the particular user in response to detecting (at 704) that the particular user is speaking in the first audio snippet. In some embodiments, MLTS 100 obtains an identifier (e.g., email address, name, etc.) of the particular user, queries a user model datastore to obtain the user model for the particular user. The user model datastore may store different user models for different conference participants or different users that have created an account with the conference system or MLTS 100.

The language preferences in the user model may be populated by the particular user when registering or accessing a conference. For instance, the conference system or MLTS 100 may query the particular user to identify the languages they speak when registering for an account with the conference system or prior to joining the current conference. In some other embodiments, MLTS 100 automatically tracks the language preferences of the particular user as the particular user participates in different conferences. For instance, MLTS 100 tracks the languages that are identified by the language identification model when the particular user speaks in other conversations, and enters the tracked languages to the user model associated with the particular user.

The user model may also store speaking preferences of the particular user. The speaking preferences include intonations, pitch, inflection, tone, accent, annunciation, pronunciation, dialect, projection, sentence structure, articulation, timbre, and/or other vocal properties of the particular user. In some embodiments, MLTS 100 may determine differences between the particular user's vocal properties and those modeled for the various languages in the language identification model, and may enter the differences or the particular user's vocal properties as the speaking preferences stored to the user model.

MLTS 100 filters (at 708) the vectors of the language identification model used to detect the language being spoken in the first audio snippet based on the language preferences of the particular user identified in the user model. Filtering (at 708) the language identification model includes selecting and using the vectors from the language identification model that identify the languages spoken by the particular user in order to determine the language that is spoken in the first audio snippet. For instance, if the user model specifies that the particular user speaks Italian and Arabic, MLTS 100 uses the Italian and Arabic language identification vectors to determine the language that is spoken in the first audio snippet involving the particular user speaking. MLTS 100 does not use language identification vectors for related languages, such as French, Spanish, or Farsi, in determining the language that is spoken in the first audio snippet since the user model for the particular user does not identify those languages as languages that are spoken by the particular user.

MLTS 100 determines (at 710) the language spoken by the particular user in the first audio snippet using the filtered (at 708) subset of language identification vectors. Specifically, MLTS 100 inputs the audio in the first audio snippet to the filtered subset of language identification vectors rather than all available language identification vectors. In so doing, MLTS 100 reduces the number of comparisons that are made in order to detect the language, thereby reducing the time to detect the language. MLTS 100 also improves the accuracy of the detected language as MLTS 100 may rule out or eliminate related or similar languages that the particular user does not speak when determining the language that is spoken by the particular user in the first audio snippet. For instance, some languages share common words, sounds, pitch, and/or other vocal properties. By using the filtered subset of the language identification vectors associated with the particular user's spoken languages, MLTS 100 eliminates the possibility of a false positive or an incorrect language being identified.

In some embodiments, determining (at 710) the language spoken by the particular user includes modifying the filtered (at 708) subset of language identification vectors based on the speaking preferences and/or vocal properties of the particular user tracked in the user model. For instance, the user may not roll their r's or may speak with a British, Australian, or American accent when speaking English words. MLTS 100 may modify the language identification vectors so that the language identification accounts for and/or is not impacted by the particular user not rolling their r's or speaking a language with a particular accent that changes how certain words are pronounced or expressed.

MLTS 100 transcribes (at 712) the first audio snippet using a translation engine for the determined (at 710) language spoken by the particular user. By using the language preferences of the particular user stored in the user model to reduce the number of language identification vectors against which to determine the spoken language of the first audio snippet, MLTS reduces the total time to determine the spoken language which also reduces the delay associated with generating the transcription of the spoken dialog. Moreover, by narrowing the determined language to those spoken by the particular user, MLTS 100 reduces the possibility of having to retranscribe the audio snippet because of an earlier incorrect language identification.

Figure 8:
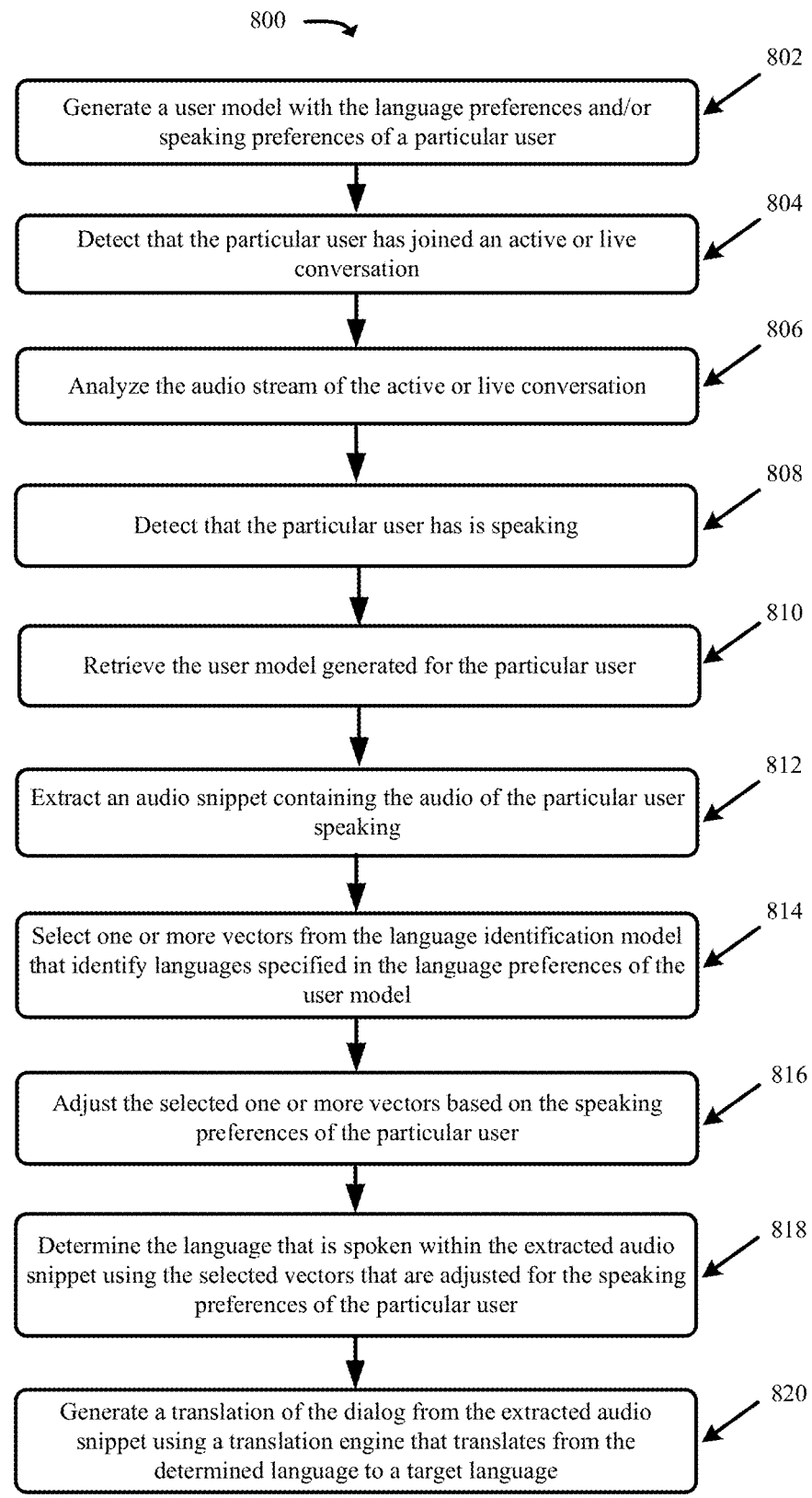
FIG. 8 presents a process for improving the multi-language detection and transcription with the user models in accordance with some embodiments presented herein.

FIG. 8 presents a process 800 for improving the multi-language detection and transcription with the user models in accordance with some embodiments presented herein. Process 800 is implemented by MLTS 100.

Process 800 includes generating (at 802) a user model with the language preferences and/or speaking preferences of a particular user. The user model may be associated with and/or linked to an identifier that identifies the particular user in different conferences. The identifier may include login information or access credentials with which the particular user accesses the different conferences, an email address that the particular user uses to join the different conferences, a network address (e.g., Internet Protocol ("IP") address, Media Access Control ("MAC") address, etc.), a device fingerprint or signature, and/or other user or device identifying information that uniquely identifies the particular user. In some embodiments, the user model is associated with an audio sample of the particular user's voice.

In some embodiments, generating (at 802) the user model includes receiving input from the particular user for the languages spoken by the particular user and/or that the particular user is comfortable using in conversations with others. In some other embodiments, generating (at 802) the user model includes automatically populating the language preferences of the user model based on MLTS 100 tracking and detecting different languages spoken by the particular user in different conferences.

The speaking preferences of the particular user represent speech patterns, accents, and/or other vocal properties that are user-specific and/or that deviate in some capacity from the vectors of the language identification model for the same language. In some embodiments, MLTS 100 tracks and/or models the speaking preferences of the particular user based on previously encountered dialog of the particular user in prior conferences, conversations, and/or audio streams.

Process 800 includes detecting (at 804) that the particular user has joined an active or live conversation. In some embodiments, MLTS 100 detects (at 804) the particular user joining the conversation when the particular user identifier is associated with the conversation or is provided when entering or joining conversation.

Process 800 includes analyzing (at 806) the audio stream of the active or live conversation. MLTS 100 analyzes (at 806) the audio stream to detect changes in the audio stream corresponding to different participants speaking. In some embodiments, MLTS 100 analyzes (at 806) the audio stream and detects when the different speakers begin speaking based on different audio streams from different conference devices of the different participants becoming active and inactive, and the different audio streams of the different conference devices being associated with the user identifiers.

Process 800 includes detecting (at 808) that the particular user is speaking. In response to detecting (at 808) that the particular user is speaking, process 800 includes retrieving (at 810) the user model generated (at 802) for the particular user, and extracting (at 812) an audio snippet containing the audio of the particular user speaking. Retrieving (at 808) the user model includes selecting the identifier for the user that is determined to be speaking (e.g., the particular user) based on the audio stream from the particular user's device becoming active and being associated with the particular user identifier, and retrieving the user model of the particular user using the identifier. Extracting (at 812) the audio snippet includes generating an audio snippet that includes the audio of a single speaker speaking. For instance, if a first user speaks from 0-5 seconds and a second user speaks from 6-12 seconds, MLTS 100 extracts a first audio snippet for the 0-5 seconds of the audio stream with the first user speaking, and extracts a second audio snippet for the 6-12 seconds of the audio stream with the second user speaking.

Process 800 includes selecting (at 814) one or more vectors from the language identification model that identify the languages specified in the language preferences of the retrieved (at 810) user model. For instance, if the language preferences specify that the particular user speaks German and Russian, then MLTS 100 selects (at 814) the one or more vectors that were created in the language identification model for detecting and/or differentiating between the German and Russian languages.

Process 800 includes adjusting (at 816) the selected (at 814) one or more vectors based on the speaking preferences of the particular user. The speech preferences are stored in the particular user's user model. Adjusting (at 816) the one or more vectors includes modifying one or more of the acoustic features associated with the vectors to account for user-specific vocal properties of the particular user. For instance, the speaking preferences may indicate that the particular user does not roll their r's when speaking, and adjusts any of the selected (at 814) vectors to deemphasize any neurons in which the rolling of the r is used as an acoustic feature for language detection. As another example, the speaking preferences may indicate that the particular user speaks a first language with an accent and/or other acoustic features of a second language, and uses certain words of the second language when speaking in the first language. Accordingly, MLTS 100 may adjust (at 816) the selected (at 814) vectors to deemphasize the acoustic features that are associated with the user's accent and to ignore the words of the second language that the particular user uses when speaking the first language.

Process 800 includes determining (at 818) the language that is spoken by the particular user within the extracted audio snippet using the selected (at 814) vectors that are adjusted (at 816) for the speaking preferences of the particular user. If the particular user only speaks a single language, as identified in the language preferences of the user model, then the language associated with the extracted audio snippet may be set to that single language with or without further analysis by the selected (at 814) vectors.

Determining (at 818) the language includes setting the current language to whichever language is output from the selected (at 814) vectors with the highest probability value even if the highest probability value does not satisfy a threshold amount of certainty. For instance, if the particular user is known to speak Spanish and Portuguese, and the language identification models detect Spanish with a 20% certainty and Portuguese with a 60% certainty that is below an 80% threshold certainty, MLTS 100 may nevertheless determine (at 818) that the language spoken in the extracted audio snippet is Portuguese because the particular user does not speak any other languages and because Portuguese is identified with a higher probability than Spanish.

Process 800 includes generating (at 820) a translation of the dialog from the extracted audio snippet using a translation engine that translates from the determined (at 818) language that is spoken in the extracted audio snippet to a different target language that is selected by a listening participant. In some embodiments, the listening participant identifies a preferred language that the dialog from all speakers should be translated to, and MLTS 100 selects the translation engine that converts from the determined (at 818) language of the extracted audio snippet to the preferred language of the listening participant. In some other embodiments, MLTS 100 determines the target language for the listening participant based on the language preferences of the listening participant that are tracked in a user model of that listening participant. For instance, if the user model of the listening participant specifies that the listening participant speaks Arabic and Japanese with Arabic being a preferred language, then MLTS 100 automatically selects the translation engine that converts from the determined (at 818) language of the extracted audio snippet to Arabic without the listening participant having to configure or specify Arabic as the target language for the translations.

Figure 9:
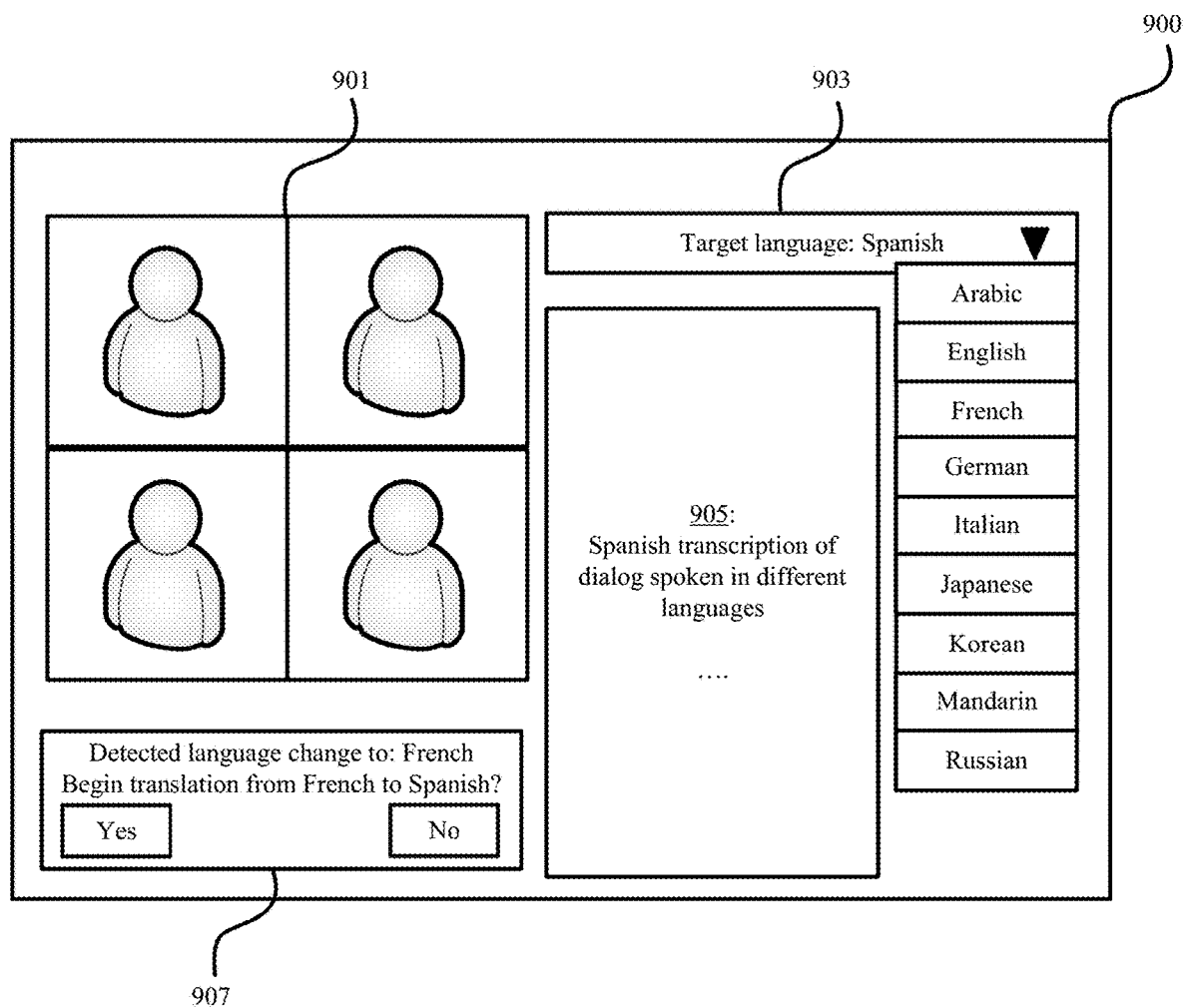
FIG. 9 presents an example user interface ("UI") that provides real-time transcription of multiple languages in accordance with some embodiments presented.

FIG. 9 presents an example user interface ("UI") 900 that provides real-time transcription of multiple languages in accordance with some embodiments presented. UI 900 is generated by MLTS 100 for multi-lingual users participating in the same conversation or conference. UI 900 includes window 901, interactive element 903, and transcription field 905.

Window 901 presents video streams, icons, images, and/or identifiers for different users participating in the conference. Window 901 may be dynamic and may change in response to whichever user is speaking. For instance, the speaker's video stream or image may be enlarged or highlighted relative to the video stream or image of other users that are listening. Window 901 may also change in order to present a document, presentation, whiteboard, files, and/or interactive elements for the users to simultaneously view or interact with.

Interactive element 903 is a control with which the user sets their desired target language for the transcription. MLTS 100 selects the translation engines for converting the dialog in the spoken or detected language to the desired target language set by the user using interactive element 903.

Transcription field 905 presents the text for the dialog in the different spoken languages that is translated to the desired target language set using interactive element 903. For instance, a first user sets interactive element 903 to English in their UI 900, MLTS 100 transcribes the dialog in the different spoken languages to English for the first user, and the transcribed dialog is presented in transcription field 905 of UI 900 running on the first user device. A second user sets interactive element 903 to Spanish in their UI 900, MLTS 100 transcribes the dialog in the different spoken languages to Spanish for the first user, and the transcribed dialog is presented in transcription field 905 of UI 900 running on the second user device.

In some embodiments, MLTS 100 performs the language detection, and provides the users with the option to transition the translation from a current language to the newly detected language. For instance, UI 900 may present interactive element 907 upon detecting that the spoken language has changed and/or is different than a last detected language. Interactive element 907 identifies the new language that is detected, and the user has the option to confirm the detected language change. In response to confirming the language change, MLTS 100 uses a translation engine that converts from the new language to the target language set by the user. Otherwise, MLTS 100 continues converting the dialog using the translation engine of the last detected and/or confirmed language.

The embodiments presented above are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the above descriptions are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things ("IoT") devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and non-volatile, removable and non-removable media implemented in any method or technology for storage of information such as computer-readable instructions, data structures, program modules, or other data. Computer storage media can include, but is not limited to, random access memory ("RAM"), read only memory ("ROM"), electrically erasable programmable ROM ("EEPROM"), flash memory, or other memory technology, compact disk ROM ("CD-ROM"), digital versatile disks ("DVDs") or other optical storage, solid state drives, hard drives, hybrid drive, or any other medium that can be used to store the desired information and that can be accessed to retrieve that information.

It is appreciated that the presented systems and methods can be implemented in a variety of architectures and configurations. For example, the systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood, that terms "user" and "participant" have equal meaning in the following description.

What is claimed is:

1. A computer-implemented method for machine-generated transcription of different languages that are spoken in audio streams, the computer-implemented method comprising:

receiving an audio stream involving one or more speakers speaking multiple languages;

identifying a first user that speaks during a first snippet of the audio stream;

selecting a user model comprising different languages spoken by the first user;

filtering a plurality of vectors from a trained neural network to a subset of the plurality of vectors based on the different languages from the user model, wherein each vector of the plurality of vectors is used to detect a different language and the subset of vectors correspond to vectors of the trained neural network that are used to detect the different languages spoken by the first user;

determining, using the subset of vectors of the trained neural network, that a first language is spoken in the first snippet of the audio stream based on a first vector of the subset of vectors outputting a first probability value that satisfies a threshold probability for a first set of features of the first snippet and the first probability value being greater than probability values output by other vectors of the subset of vectors for the first set of features;

transcribing the first snippet from the first language to a target language in response to determining that the first language is spoken in the first snippet;

detecting, using the trained neural network, a transition from the first language to a new language based on the first vector outputting a probability value that does not satisfy the threshold probability for a second set of features from a second snippet of the audio stream;

transcribing the second snippet from the new language to the target language in response to detecting the transition;

determining, using the trained neural network, that a second language is spoken in a third snippet of the audio stream based on a second vector of the trained neural network outputting a second probability value that satisfies the threshold probability for a third set of features of the third snippet; and transcribing the third snippet from the second language to the target language in response to determining that the second language is spoken in the third snippet.

2. The computer-implemented method of claim 1, further comprising:

training a neural network using audio from a plurality of speakers speaking a plurality of different languages, wherein training the neural network comprises generating the plurality of vectors for the trained neural network based on different sets of features from the audio that identify each language of the plurality of different languages with different probability values, and wherein the plurality of vectors comprise the first vector and the second vector.

3. The computer-implemented method of claim 1, further comprising:

selecting a first translation engine from a plurality of translation engines in response to determining that the first language is spoken in the first snippet;

generating a transcription of the first snippet using the first translation engine;

selecting a second translation engine from the plurality of translation engines in response to detecting the transition and determining that the second language is spoken in the third snippet; and generating a transcription of the second snippet and the third snippet using the second translation engine.

4. The computer-implemented method of claim 1, further comprising:

causing to display a first transcription that translates the first snippet from the first language to the target language in a user interface of a device that is connected to the audio stream; and causing to display a second transcription that translates the second snippet and the third snippet from the second language to the target language in the user interface of the device.

5. The computer-implemented method of claim 1, further comprising:

detecting a first speaker speaking during a first segment of the audio stream;

generating the first snippet with audio from the first segment of the audio stream;

detecting a second speaker speaking during a second segment of the audio stream; and generating the second snippet with audio from the second segment of the audio stream.

6. The computer-implemented method of claim 1, further comprising:

analyzing the second snippet with a first set of vectors of the trained neural network in response to determining that the first language is spoken in the first snippet; and analyzing the second snippet with a second set of vectors from the trained neural network in response to detecting the transition.

7. The computer-implemented method of claim 6, further comprising:

determining that the new language is the second language based on the second set of vectors outputting at least one probability value that satisfies the threshold probability for the second set of features; and wherein transcribing the second snippet from the new language to the target language comprises translating the second snippet from the second language to the target language.

8. The computer-implemented method of claim 1, wherein transcribing the second snippet from the new language to the target language comprises:

generating a first transcription of the second snippet from the first language to the target language; and replacing the first transcription with a second transcription of the second snippet from the second language to the target language in response to determining that the second language is spoken in the third snippet and the third snippet following the second snippet in the audio stream.

9. The computer-implemented method of claim 1, wherein transcribing the second snippet from the new language to the target language comprises:

generating a first transcription of the second snippet from the first language to the target language and a second transcription of the second snippet from the second language to the target language in response to detecting the transition;

detecting the target language with a first probability in the first transcription and with a second probability in the second transcription; and outputting the second transcription for the second snippet based on the second probability being greater than the first probability.

10. The computer-implemented method of claim 1, wherein transcribing the second snippet from the new language to the target language comprises:

generating a first transcription of the second snippet from the first language to the target language and a second transcription of the second snippet from the second language to the target language in response to detecting the transition;

comparing the first transcription against the second transcription; and providing the second transcription as a correct translation of the second snippet based on results of said comparing.

11. The computer-implemented method of claim 1, further comprising:

selecting a language of the first snippet from one of the different languages spoken by the first user using the subset of vectors of the trained neural network that are associated with identification of the first language and at least one other language.

12. The computer-implemented method of claim 1, further comprising:

extracting the first set of features from the first snippet, wherein the first set of features comprises a first set of vocal properties with which the first user speaks during the first snippet; and extracting the second set of features from the second snippet, wherein the second set of features comprises a different second set of vocal properties with which a second user speaks during the second snippet.

13. The computer-implemented method of claim 12, wherein the first set of vocal properties comprises one or more of a different intonation, pitch, inflection, tone, accent, annunciation, pronunciation, dialect, projection, sentence structure, articulation, and timbre than the second set of vocal properties.

14. The computer-implemented method of claim 1, further comprising:
generating a user interface that plays the audio stream on a user device while outputting a first transcription of the first snippet from the first language to the target language, a transcription of the second snippet from the second language to the target language, and a transcription of the third snippet from the second language to the target language as audio from each of the first snippet, second snippet, and third snippet is played on the user device.

15. The computer-implemented method of claim 1, further comprising:
setting the target language to a third language of a plurality of languages;
configuring a first translator for the first snippet based on setting the target language to the third language and determining that the first language is spoken in the first snippet, wherein the first translator translates from the first language to the third language; and
configuring a second translator for the third snippet based on setting the target language to the third language and determining that the second language is spoken in the third snippet, wherein the second translator translates from the second language to the third language.

16. A multi-language translation system, comprising:
one or more hardware processors configured to:
receive an audio stream involving one or more speakers speaking multiple languages;
identify a first user that speaks during a first snippet of the audio stream;
select a user model comprising different languages spoken by the first user;
filter a plurality of vectors from a trained neural network to a subset of the plurality of vectors based on the different languages from the user model, wherein each vector of the plurality of vectors is used to detect a different language and the subset of vectors correspond to vectors of the trained neural network that are used to detect the different languages spoken by the first user;
determine, using the subset of vectors of the trained neural network, that a first language is spoken in the first snippet of the audio stream based on a first vector of the subset of vectors outputting a first probability value that satisfies a threshold probability for a first set of features of the first snippet and the first probability value being greater than probability values output by other vectors of the subset of vectors for the first set of features;
transcribe the first snippet from the first language to a target language in response to determining that the first language is spoken in the first snippet;
detect, using the trained neural network, a transition from the first language to a new language based on the first vector outputting a probability value that does not satisfy the threshold probability for a second set of features from a second snippet of the audio stream;
transcribe the second snippet from the new language to the target language in response to detecting the transition;
determine, using the trained neural network, that a second language is spoken in a third snippet of the audio stream based on a second vector of the trained neural network outputting a second probability value that satisfies the threshold probability for a third set of features of the third snippet; and
transcribe the third snippet from the second language to the target language in response to determining that the second language is spoken in the third snippet.

17. The multi-language translation system of claim 16, further comprising:
a plurality of translation engines;
wherein the one or more hardware processors are further configured to:
select a first translation engine from the plurality of translation engines in response to determining that the first language is spoken in the first snippet;
generate a transcription of the first snippet using the first translation engine;
select a second translation engine from the plurality of translation engines in response to detecting the transition and determining that the second language is spoken in the third snippet; and
generate a transcription of the second snippet and the third snippet using the second translation engine.

18. The multi-language translation system of claim 16, wherein the one or more hardware processors are further configured to:
detect a first speaker speaking during a first segment of the audio stream;
generate the first snippet with audio from the first segment of the audio stream;
detect a second speaker speaking during a second segment of the audio stream; and
generate the second snippet with audio from the second segment of the audio stream.

19. A non-transitory computer-readable medium storing program instructions that, when executed by one or more hardware processors of a multi-language translation system, cause the multi-language translation system to perform operations comprising:
receive an audio stream involving one or more speakers speaking multiple languages;
identify a first user that speaks during a first snippet of the audio stream;
select a user model comprising different languages spoken by the first user;
filter a plurality of vectors from a trained neural network to a subset of the plurality of vectors based on the different languages from the user model, wherein each vector of the plurality of vectors is used to detect a different language and the subset of vectors correspond to vectors of the trained neural network that are used to detect the different languages spoken by the first user;
determine, using the subset of vectors of the trained neural network, that a first language is spoken in the first snippet of the audio stream based on a first vector of the subset of vectors outputting a first probability value that satisfies a threshold probability for a first set of features of the first snippet and the first probability value being greater than probability values output by other vectors of the subset of vectors for the first set of features;

transcribe the first snippet from the first language to a target language in response to determining that the first language is spoken in the first snippet;

detect, using the trained neural network, a transition from the first language to a new language based on the first vector outputting a probability value that does not satisfy the threshold probability for a second set of features from a second snippet of the audio stream;

transcribe the second snippet from the new language to the target language in response to detecting the transition;

determine, using the trained neural network, that a second language is spoken in a third snippet of the audio stream based on a second vector of the trained neural network outputting a second probability value that satisfies the threshold probability for a third set of features of the third snippet; and transcribe the third snippet from the second language to the target language in response to determining that the second language is spoken in the third snippet.

\* \* \* \* \*